United States Patent
Atwell et al.

[15] 3,639,105
[45] Feb. 1, 1972

[54] PREPARATION OF HYDROSILANES

[72] Inventors: William H. Atwell; Rudolf M. Salinger; Richard P. Seibert, all of Midland, Mich.

[73] Assignee: Dow Corning Corporation, Midland, Mich.

[22] Filed: Mar. 27, 1970

[21] Appl. No.: 23,443

[52] U.S. Cl....................23/366, 260/448.2 E, 260/448.2 H, 23/204, 260/448.8 R
[51] Int. Cl........................................C07f 7/02, C01b 33/04
[58] Field of Search...............260/448.2 E, 448.2 H; 23/366, 23/204

[56] References Cited

OTHER PUBLICATIONS

Inouye, Chemical Abstracts, (1959), Vol. 53, pages 17,888–17,889 QD1A51.

Primary Examiner—James E. Poer
Assistant Examiner—Werten F. W. Bellamy
Attorney—Robert F. Fleming, Jr., Laurence R. Hobey, Harry D. Dingman, Howard W. Hermann and Joseph R. Radzius

[57] ABSTRACT

Hydrosilanes are produced by contacting a disilane with hydrogen gas under pressure and thereafter heating the mixture in the presence of a transition metal catalyst such as palladium on charcoal. The recovered hydrosilanes are particularly useful as precursors in the production of other useful materials.

10 Claims, No Drawings

PREPARATION OF HYDROSILANES

This invention relates to a process for preparing hydrosilanes of the formula $R_3SiH$, comprising A. contacting
1. a disilane of the formula $R_3Si-SiR_3$, in which R is selected from the group consisting of alkyl radicals of from one to six carbon atoms carbon atoms inclusive, alkoxy radicals of from one to six carbon atoms inclusive, a phenyl radical, a halogen atom, a 3,3,3-trifluoropropyl radical, a hydrogen atom, and a trimethylsiloxy radical, with
2. hydrogen gas under pressure, and B. heating the above admixture at a temperature of from 25° C. to 250° C., in the presence of
3. at least 1.0 percent by weight based upon the weight of the disilane (1) of a transition metal catalyst, and thereafter C. recovering the hydrosilane.

As noted above, R can be an alkyl radical of from one to six carbon atoms such as the methyl, ethyl, propyl, isopropyl, butyl, t-butyl, amyl and the hexyl radical. R may also be an alkoxy radical of from one to six carbon atoms such as the methoxy, ethoxy, propoxy, butoxy, or the hexoxy radical. In addition, R can be a phenyl radical, a hydrogen atom, a 3,3,3-trifluoropropyl radical, a trimethylsiloxy [$(CH_3)_3SiO$] radical, or a halogen atom such as the chlorine atom, bromine atom, or iodine atom.

The term "transition metal catalyst" is understood to mean and is intended to include materials such as palladium on charcoal, ruthenium on charcoal, rhodium on charcoal and the like. The aforementioned "transition metal catalysts" are commercially available materials which are well known in the art. For example, these are normally provided in powdered or pellet form and consist of the metal, e.g., palladium at 5 percent or greater on a charcoal support. Charcoal supports containing 5 percent or more metal have been found to be suitable for purposes of the present invention; however, in view of economical considerations and the like, a support containing from about 5 to about 15 percent metal is particularly suitable.

The term "transition metal catalysts" is also intended to encompass materials which are not commercially available such as a variety of organophosphine complexes of transition metals, e.g., [(organo)$_3$ P]$_2$PdCl$_2$, [(organo)$_3$ P]$_2$PtCl$_2$, [(organo)$_3$ P]$_2$NiCl$_2$, and the like in which the organo group is representative of a phenyl radical or an alkyl radical of from one to six carbon atoms (illustrative examples of which have been noted above). These organophosphine complexes of transition metals are prepared by merely adding the organophosphine, e.g., tributyl phosphine, to either an aqueous or alcoholic solution of the appropriate transition metal salt, e.g., $K_2PdCl_4$.

The particular transition metal catalyst which is most effective is dependent upon the specific structure of the disilane (1). That is, it has been found that when the disilane (1) contains only alkyl groups such as methyl, the aforementioned commercially available catalysts such as palladium on charcoal function best, whereas when the disilane (1) contains a halogen atom such as chlorine, the aforementioned organophosphine complexes of transition metals, e.g., [(n—C$_4$H$_9$)$_3$P]$_2$PdCl$_2$ are especially suitable.

The disilanes (1) are readily available and well-known materials. That is, the disilane (1) can be prepared by standard means, e.g., alkoxylation, the Grignard process, and reduction of alkylchlorodisilanes. It is to be understood, of course, that in certain cases the disilane (1) may consist of mixture of materials. For example, when the disilane (1) contains both alkyl and halogen substituents in combination such as dimethyl-tetrachlorodisilane and its isomers, trimethyltrichlorodisilane and its isomers, tetramethyldichlorodisilane and its isomers, and pentamethylchlorodisilane, these materials may be obtained from the high boiling residue formed when methyl chloride is passed over silicon in the presence of heat and a copper catalyst. If desired, the illustrative aforementioned mixture may be separated and its individual components may be employed in the process described herein, or the mixture itself may be used.

The method described herein must be conducted under pressure which may vary from 50 p.s.i.g. to 3,000 p.s.i.g. or more. Absent the necessary pressure, the reaction will not proceed or will proceed so slowly as to be economically impractical. Selection of the most effective pressure is also dependent upon the specific structure of the disilane (1). For example, halogen-substituted disilanes tend to require more pressure, e.g., about 1,000 or more p.s.i.g., than do alkyl-substituted disilanes which require as little as 50 p.s.i.g.

The method described herein may be readily conducted at essentially room temperature or 25° C. However, to facilitate the reaction it is preferred that a moderate temperature of from about 100° C. to about 150° C. be employed. At temperatures in excess of 250° C., catalyst and/or disilane decomposition tends to occur which deleteriously affects the reaction.

The ingredients (1), (2), and (3) may be mixed in any conventional manner and in any order most feasible and convenient under the circumstances. The best means of practicing the present invention, however, is to mix the disilane (1) with the desired catalyst (3). The mixture is then contacted with the hydrogen gas under the appropriate pressure. The hydrosilane is then recovered in standard fashion.

In contrast the methods known in the art, under the conditions and by the method described herein significantly increased yields of the hydrosilanes are obtained. In addition, heretofore, it was not possible to cleave the silicon-silicon linkage by means of hydrogenolysis under such mild conditions, i.e., at temperatures of 25° C. or less.

The hydrosilanes which are obtained are useful as precursors in the production of other useful materials, e.g., hydrogen-substituted siloxanes which in themselves are useful as crosslinkers for silicone elastomers. The hydrosilanes are also employed for the preparation of organo functional derivatives by addition to suitable olefin compounds.

The following example is illustrative only and is not intended to limit the invention which is properly delineated in the appended claims.

EXAMPLE 1

The disilane, catalyst, and a solvent* were added to a suitable hydrogenation apparatus. The desired hydrogen gas pressure was applied followed by the proper application of heat. Subsequent to reaction, the reaction product was analyzed by gas chromatography and in all cases, the products were identified by the use of known standards.

For low pressure runs (<100 p.s.i.g.), standard Parr hydrogenation apparatus was employed. The high pressure runs (>100 p.s.i.g.) were carried out in a pressure reactor equipped with a gas boost compressor and magnetically driven stirrer. The results obtained (using a variety of disilanes and catalysts) under the prescribed conditions are provided in the following Table I.

TABLE I

| Sample [1] | Catalyst type (g.) | Disilane (g.) | Pressure (p.s.i.g.) | Temp. (° C.) |
|---|---|---|---|---|
| 1 | 5% Pd/C (10) | $(CH_3)_xCl_{6-x}Si_2$ (118) [2] | 1,520 | 150 |
| 2 | 5% Pt/C (8.9) | $(CH_3)_xCl_{6-x}Si_2$ (111) | 4,100 | 250 |
| 3 | 5% Ru/C (10) | $(CH_3)_xCl_{6-x}Si_2$ (101) | 5,200 | 250 |
| 4 | 5% Rh/C (11) | $(CH_3)_xCl_{6-x}Si_2$ (103) | 3,450 | 250 |
| 5 | $K_2PdCl_4$ (2.5) | $(CH_3)_xCl_{6-x}Si_2$ (108) | 4,570 | 250 |
| 6 | [$C_6H_5(CH_3)_2P$]$_2PdCl_2$ (1.0) | $(CH_3)_xCl_{6-x}Si_2$ (100) | 750 | 120 |

TABLE I—Continued

| Sample [1] | Catalyst type (g.) | Disilane (g.) | Pressure (p.s.i.g.) | Temp. (° C.) |
|---|---|---|---|---|
| 7 | $[(C_4H_9)_3P]_2PdCl_2$ (1.0) | $(CH_3)_xCl_{6-x}Si_2$ (100) | 750 | 120 |
| 8 | $[(C_4H_9)_3P]_2PdCl_2$ (1.0) | $(CH_3)_xCl_{6-x}Si_2$ (100) | 3,725 | 120 |
| 9 | $[(C_4H_9)_3P]_2PdCl_2$ (1.0) | $Si_2Cl_6$ (108) | 2,080 | 120 |
| 10 | $[(C_4H_9)_3P]_2PdCl_2$ (0.5) | $CH_3Cl_2SiSiCl_2CH_3$ (50) | 3,000 | 120 |
| 11 | $[(C_4H_9)_3P]_2PdCl_2$ (0.5) | $(CH_3)_2ClSiSiCl_2CH_3$ (52) | 3,000 | 120 |
| 12 | $[(C_4H_9)_3P]_2PdCl_2$ (0.52) | $(CH_3)_xCl_{6-x}Si_2$ (100) [2] | 2,450 | 200 |
| 13 | $[(C_4H_9)_3P]_2NiCl_2$ (2.0) | $(CH_3)_6Si_2$ (20) | 55 | 25 |
| 14 | 5% Pd/C (0.8) | $C_6H_5(CH_3)_2SiSi(CH_3)_2C_6H_5$ (10) | 55 | 25 |
| 15 | 5% Pd/C (0.3) | $C_4H_9(CH_3)_2SiSi(CH_3)_2C_4H_9$ (5) | 55 | 25 |
| 16 | 5% Pd/C (0.1) | $H(CH_3)_2SiSi(CH_3)_2H$ (7) | 55 | 25 |
| 17 | 5% Pd/C (0.3) | $[(CH_3)_3SiO]_2CH_3SiSiCH_3[OSi(CH_3)_3]_2$ (7) | 55 | 25 |
| 18 | 5% Pd/C (0.3) | $(CH_3O)_6Si_2$ (7) | 55 | 25 |

[1] All these reactions were carried out in the presence of an inert solvent, either cyclohexane or 2,2,5-trimethylhexane. This solvent was used as a standard for quantitative g.l.c. analyses of the reaction mixtures.

[2] $(CH_3)_xCl_{6-x}Si_2$ refers to a mixture of the disilanes $(CH_3)_2Si_2Cl_4$ and $(CH_3)_3Si_2Cl_3$.

| Sample | Products (weight percent) | | | | | | Others |
|---|---|---|---|---|---|---|---|
| | $CH_3H_2SiCl$ | $(CH_3)_2HSiCl$ | $CH_3HSiCl_2$ | $CH_3SiCl_3$ | $(CH_3)_2SiCl_2$ | $(CH_3)_xCl_{6-x}Si_2$ | |
| 1 | | 1.1 | 12.4 | 5.3 | 1.0 | 81.6 | Unknown (11.7). |
| 2 | | 1.5 | 6.5 | 4.4 | 2.3 | 73.9 | Unknown (7.1). |
| 3 | | 0.5 | 3.5 | 7.6 | 0.5 | 80.8 | Unknown (10.5). |
| 4 | | 0.5 | 6.0 | 9.6 | 1.3 | 72.1 | Unknown (21.2). |
| 5 | 0.6 | 0.9 | 21.2 | 22.0 | 11.3 | 22.8 | Unknown (23.9). |
| 6 | | 0.1 | 43.2 | 6.7 | 0.1 | 26.1 | Unknown (3.5). |
| 7 | 2.2 | 2.4 | 48.8 | 21.8 | 8.7 | 12.6 | Unknown (10.4). |
| 8 | | 6.8 | 63.6 | 7.9 | 3.2 | 8.1 | $HSiCl_3$. |
| 9 | | | 69 | 24.4 | 3.5 | | |
| 10 | 6.5 | | 29.8 | 2.0 | 8.9 | | Unknown (26). |
| 11 | | 33.2 | 48.8 | 28.3 | 6.5 | 11.2 | Unknown (5.2). |
| 12 | 6.3 | 2.8 | 39.7 | | | | $(CH_3)_3SiH$ (80); $(CH_3)_6Si_2$ (20). |
| 13 | | | | | | | $C_6H_5(CH_3)_2SiH$ (5); $C_6H_5(CH_3)_2SiSi(CH_3)_2C_6H_5$ |
| 14 | | | | | | | $C_4H_9(CH_3)_2SiH$ (50); $C_4H_9(CH_3)_2SiSi(CH_3)_2C_4H_9$ (50). |
| 15 | | | | | | | $(CH_3)_2SiH_2$ (40); $(CH_3)_2SiSi(CH_3)_2H$ (60). |
| 16 | | | | | | | $[(CH_3)_3SiO]_2SiCH_3H$ (75); $[(CH_3)_3SiO]_4(CH_3)_2Si_2$ (25). |
| 17 | | | | | | | $(CH_3O)_3SiH$ (20); $(CH_3O)_4Si$ (5); $(CH_3O)_6Si_2$ (75). |
| 18 | | | | | | | |

That which is claimed is:

1. A process for preparing hydrosilanes of the formula $R_3SiH$, comprising
    A. contacting
       1. a disilane of the formula $R_3Si—SiR_3$, in which R is selected from the group consisting of alkyl radicals of from one to six carbon atoms inclusive, alkoxy radicals of from one to six carbon atoms inclusive, a phenyl radical, a halogen atom, a 3,3,3-trifluoropropyl radical, a hydrogen atom, and a trimethylsiloxy radical, with
       2. hydrogen gas under pressure, and
    B. heating the above admixture at a temperature of from 25° C. to 250° C., in the presence of
       3. at least 1.0 percent by weight based upon the weight of the disilane (1) of a transition metal catalyst, and thereafter
    C. recovering the hydrosilane.

2. The method as recited in claim 1 in which the transition metal catalyst (3) is palladium on charcoal.

3. The method as recited in claim 2 in which the disilane (1) is $(CH_3)_6Si_2$.

4. The method as recited in claim 2 in which the disilane (1) is $C_6H_5(CH_3)_2Si—Si(CH_3)_2C_6H_5$.

5. The method as recited in claim 2 in which the disilane (1) is $H(CH_3)_2Si—Si(CH_3)_2H$.

6. The method as recited in claim 2 in which the disilane (1) is $(CH_3O)_6Si_2$.

7. The method as recited in claim 1 in which the transition metal catalyst (3) is $[(C_4H_9)_3P]_2PdCl_2$.

8. The method as recited in claim 7 in which the disilane (1) is a mixture of $(CH_3)_2Si_2Cl_4$ and $(CH_3)_3Si_2Cl_3$.

9. The method as recited in claim 7 in which the disilane (1) is $Cl_6Si_2$.

10. The method as recited in claim 7 in which the disilane (1) is $Cl(CH_3)_2Si—Si(CH_3)_2Cl$.

\* \* \* \* \*